United States Patent [19]

Papuchon et al.

[11] 4,340,272
[45] Jul. 20, 1982

[54] LIGHT INTENSITY MODULATOR IN AN INTEGRATED OPTICAL CIRCUIT WITH FEEDBACK MEANS

[75] Inventors: Michel Papuchon; Claude Puech, both of Paris, France

[73] Assignee: Thomson-CSF, Paris, France

[21] Appl. No.: 136,474

[22] Filed: Apr. 2, 1980

[30] Foreign Application Priority Data

Apr. 3, 1979 [FR] France .................. 79 08372

[51] Int. Cl.³ ............................................. G02B 5/174
[52] U.S. Cl. ................................................... 350/96.14
[58] Field of Search ............... 350/96.11, 96.12, 96.13, 350/96.14

[56] References Cited

U.S. PATENT DOCUMENTS

| | | | |
|---|---|---|---|
| 3,944,812 | 3/1976 | Hattori et al. | 350/96.14 |
| 3,995,311 | 11/1976 | Taylor | 350/96.14 |
| 4,070,094 | 1/1978 | Martin | 350/96.14 |
| 4,211,467 | 7/1980 | Cross et al. | 350/96.14 |

*Primary Examiner*—John K. Corbin
*Assistant Examiner*—Frank Gonzalez
*Attorney, Agent, or Firm*—Oblon, Fisher, Spivak, McClelland & Maier

[57] ABSTRACT

The invention relates to a light intensity modulator, in integrated optics and an integrated optical circuit comprising such a modulator.

The modulator comprises a two-arm interferometer in which there is created by electro-optical effect, a phase shift controlled by a modulating voltage between the light waves propagated in the two arms. It is characterized by a feedback loop comprising a light separator placed on the output guide of the interferometer, and a photodiode collecting the fraction of output intensity from the separator and supplying an electric voltage which is superimposed in the interferometer on the modulating voltage. Thus linearization of the output intensity-modulating voltage response curve is obtained.

11 Claims, 8 Drawing Figures

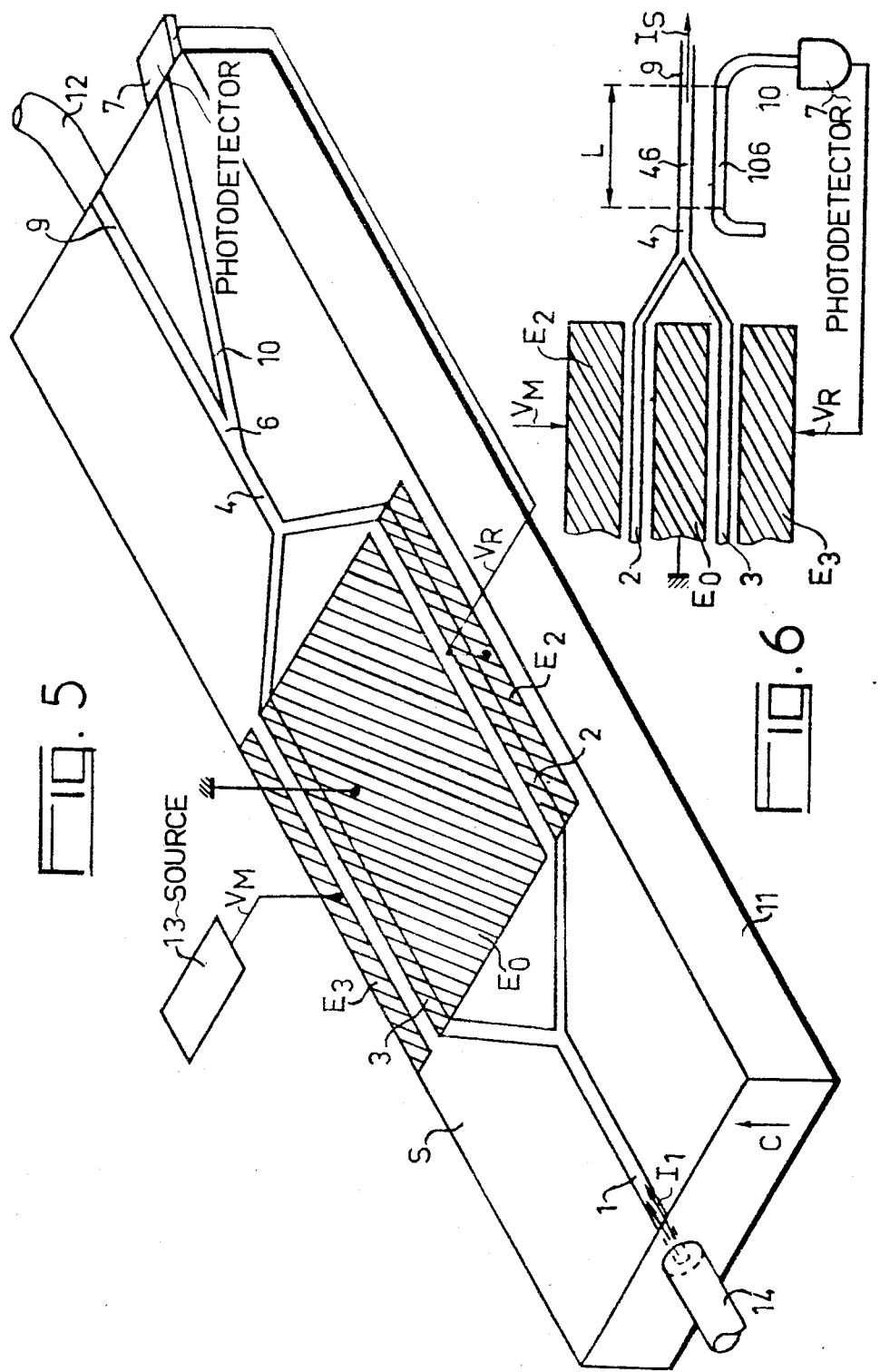

LIGHT INTENSITY MODULATOR IN AN INTEGRATED OPTICAL CIRCUIT WITH FEEDBACK MEANS

BACKGROUND OF THE INVENTION

The present invention relates to a modulator of light intensity in integrated optics.

The use of the electro-optical effect revealed particularly in ferroelectric materials has enabled light modulators to be constructed, in different embodiments compatible with integration techniques with which optical waveguides are obtained in a substrate of index $n_o$ by creating zones where the index of refraction is greater than $n_o$. One of these embodiments consists of an interferometer with two arms in which there is created, by electro-optical effect, a difference in speed of propagation in the two arms, producing an electrically controlled phase shift between the waves from the two arms. The exiting light intensity is variable with the phase shift and may then be modulated by an electric voltage inducing the electro-optical effect. It can be easily shown and experimentally ascertained that the variation of the resulting light intensity depending on the differential phase shift between the two arms is sinusoidal. Now, it is necessary in numerous applications, concerning the transmission of analog signals, to have a specific range, with linear variation, which is only verified in the vicinity of the points of inflection of the variation curve.

SUMMARY OF THE INVENTION

The invention aims at increasing the extent of the linear modulation range by using the known interferometer structure and by adding thereto an optoelectronic feedback loop. It uses for that the possibility of creating electrical fields in the two arms of the interferometer, one of the arms being for example subjected to the field from the modulation voltage, the other to a field energized by the feedback loop and proportional to the output light intensity. The invention consists then of a light intensity modulator comprising, on the surface S of a substrate having electro-optical properties, an interferometer having two arms connected to an input guide intended to receive an optical incident radiation, the radiation fractions propagated in the two arms combining at the outlet of the interferometer in an output guide, the intensity of the emerging radiation depending on the phase shift introduced into the interferometer by a modulating electrical field applied to at least one of the arms, characterized in that it comprises furthermore a light energy separator interposed on the output guide, for extracting a part of the resulting intensity so as to couple it to a photodetector supplying another modulating electric field.

The above and other objects, features and advantages of the present invention will become apparent from the following description, given solely by way of non-limiting illustration, when taken in conjunction with the accompanying drawings.

DESCRIPTION OF THE DRAWINGS

FIG. 5 shows one embodiment of the modulator of the invention.

FIGS. 6, 7 and 8 are modifications of certain parts of the modulator of FIG. 5.

DESCRIPTION OF THE PREFERRED EMBODIMENTS

Figure 1:
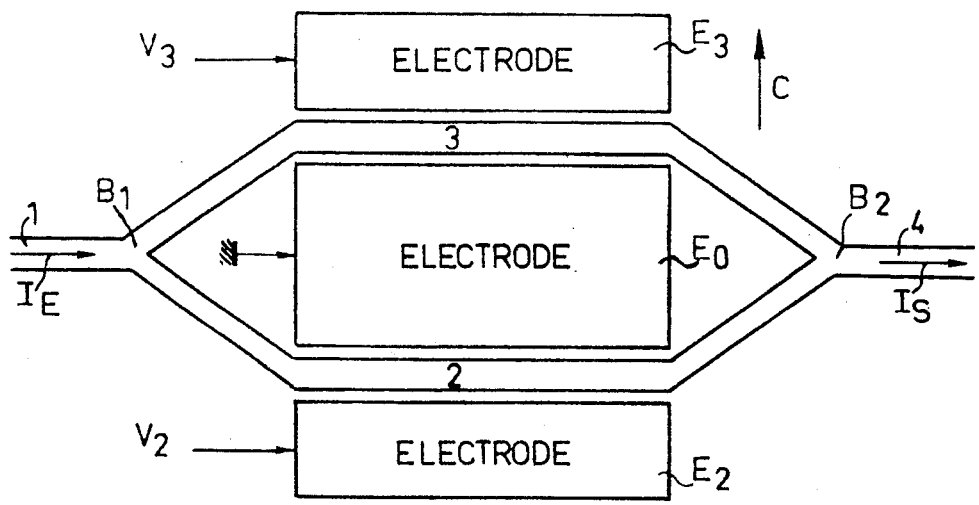
FIG. 1 shows a modulator of known type.

In FIG. 1 is shown the diagram of a two-arm interferometer capable of being used to modulate light intensity according to a known method. This interferometer comprises a monomode input waveguide branch 1 in which is coupled a light wave of intensity $I_E$. This branch 1 is divided at a fork $B_1$ into two parallel arms 2 and 3 forming monomode guides, which are again joined together at a fork $B_2$ to form a monomode output waveguide branch 4 where an intensity $I_S$ is recovered. The directions of propagation in the four guides are the same. Electrodes are disposed on each side of each of guides 2 and 3, for example a central electrode $E_0$, an electrode $E_2$ on the other side of arm 2 and to which a voltage $V_2$ is applied and an electrode $E_3$ on the other side of arm 3 to which a voltage $V_3$ is applied, electrode $E_0$ being connected to ground. The arrangement of the electrodes such as shown in the figure, i.e. not covering the guides but being adjacent thereto, causes in each of guides 2 and 3 electrical fields perpendicular to the direction of propagation of the light waves and in the plane of the figure. In this case, the mode of propagation used in the guides is a mode TE. The whole of the device is constructed on the surface of a substrate having electro-optical properties, such as lithium niobate ($LiNbO_3$), lithium tantalate ($LiTaO_3$), gallium arsenide (GaAs). In a lithium niobate substrate for example, the optical waveguides are obtained by diffusion of titanium. This diffusion is selective by using conventional photolithography processes. In the case of the figure where the electrical fields applied to the guides are in the plane of the figure, it is preferable that the axis c of the lithium niobate is also in this plane and perpendicular to the direction of propagation common to guides 1 to 4, so as to present the maximum electro-optical effect. If the voltages $V_2$ and $V_3$ are of the same sign, the electrical fields applied to arms 2 and 3 are in opposite directions; these fields cause variations in the speeds of propagation of the light waves for each of the two guides: voltage $V_3$ causes a variation $\Delta\beta_3$ which is proportional thereto; voltage $V_2$ causes a variation in the opposite direction $-\Delta\beta_2$ which is also proportional thereto. The speed variations cause at the position of fork $B_2$ a phase shift between the two waves coming from guides 2 and 3 which were originally in phase at fork $B_1$. This phase shift $\Delta\phi$ is equal to $\Delta\beta_3 L_3 + \Delta\beta_2 L_2$ where $L_2$ and $L_3$ are the lengths of the electrodes between the two forks $B_1$ and $B_2$. In general $L_2 = L_3 = L$, so that $\Delta\phi = (\Delta\beta_3 + \Delta\beta_2) L$. Of course, one of the two voltages $V_2$ or $V_3$ may be zero so that only the variation $\Delta\beta_3$ or $\Delta\beta_2$ takes place. The expression of the phase shift $\Delta\phi$ may be put in the form $$\frac{\pi(V_3 + V_2)}{V_\pi}$$

where $V_\pi$ is the sum of the voltages which cause a phase shift $\Delta\phi$ equal to $\pi$. The light waves recovered in guide 4 result from the combination of the waves from guides 2 and 3 arriving in the fork $B_2$, i.e. two waves of intensity $$\alpha \frac{I_E}{2}$$

out of phase in relation to each other by $\Delta\phi$. So the resulting intensity $I_S$ may then be written in the form $$\alpha \frac{I_E}{2}(1 + M\cos\Delta\phi) = \frac{I_E}{2}\left[1 + M\cos\frac{\pi(V_3 + V_2)}{V_\pi}\right]$$

where $\alpha$ and $M$ are constants which depend on the coupling losses and the dissymmetry of the interferometer. A similar result may be obtained with a single pair of electrodes for example $E_0$ and $E_3$. In this case $\Delta\beta_2 = 0$ and $$I_S = \alpha \frac{I_E}{2}\left(1 + M\cos\frac{\pi V_3}{V_\pi}\right).$$

Figure 2:
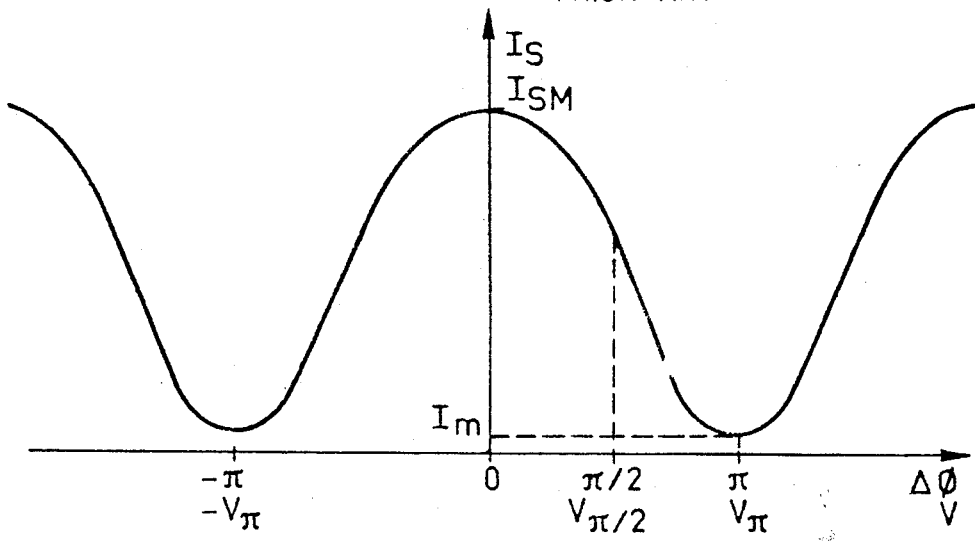
FIG. 2 is the response diagram of the modulator of FIG. 1.

FIG. 2 is the representative curve of the emerging intensity $I_S$ as a function of the phase shift $\Delta\phi$ existing at the position of fork $B_2$, or of the voltage $V$ equal to the voltage (or to the sum of the voltages) applied to one at least of electrodes $E_2$ and $E_3$, taken with its (their) sign in relation to ground. When V is zero, output voltage $I_S$ is maximum and equivalent to $I_{SM}$. When the absolute value of V increases, the light intensity $I_S$ diminishes and the minimum value $I_m$ is obtained for $V = V_\pi$. Close to $V_\pi/2$, the variation of $I_S$ may be considered in the first order as linear depending on $\Delta\phi$ or V. However, the harmonic rate of the variation of $I_S$ depending on $$V - \frac{V_\pi}{2}$$

increases very rapidly the further we move away from $V_\pi/2$.

Figure 3:
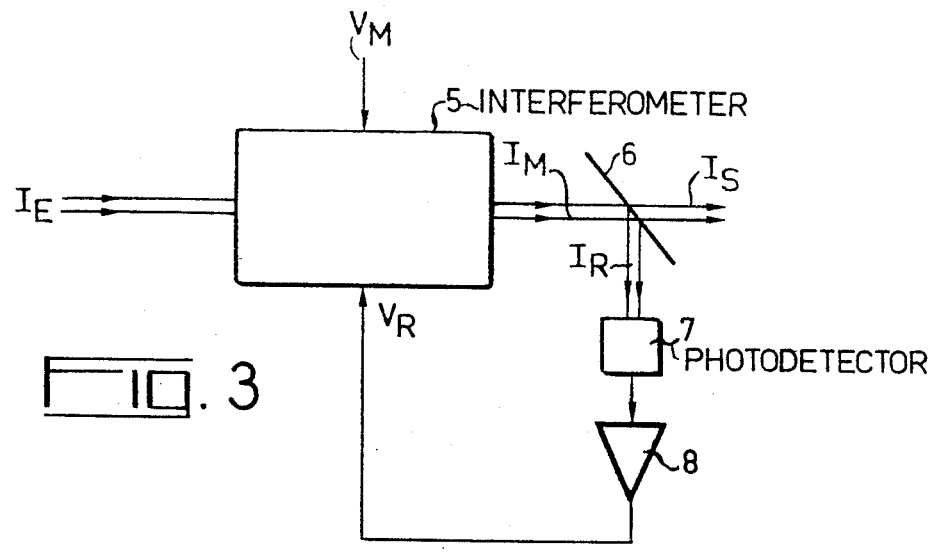
FIG. 3 is a diagram of a modulator in accordance with the invention.

To improve the linearity of the variation curve of the resulting light intensity by reducing the harmonic rate 2, the invention provides in association with the interferometer a feedback loop, as shown schematically in FIG. 3. In this figure, block 5 represents the whole of the interferometer represented in FIG. 1 with its two voltage inputs here called $V_M$ which is the modulating voltage and $V_R$ which is the feedback voltage the origin of which will be seen further on. At the input of interferometer 5 there arrives a light wave of intensity $I_E$, the intensity $I_M$ recovered at the output of the interferometer is separated into two by a means 6 so as to obtain a constant fraction $I_S$ which will be emerging intensity and another constant fraction $I_R$ which is applied to a photodetector 7 supplying an electrical voltage. This latter is possibly amplified if necessary by an amplifier 8 which supplies the feedback voltage $V_R$. The total voltage V which acts on the interferometer is the sum of the modulating voltage $V_M$ and the feedback voltage $V_R$ which is directly connected by a linear relationship to the intensities $I_R$ and $I_M$. Thus, the intensity $I_M$ may be put in the form $$\alpha \frac{I_E}{2}\left[1 + M\cos\left(\frac{\pi V_M}{V_\pi} + \frac{\pi G I_M}{V_\pi}\right)\right]$$

where G is the feedback rate tied to the transmission factor of separator 6, to the coefficient of photodetector 7 and to the gain of amplifier 8.

Figure 4:
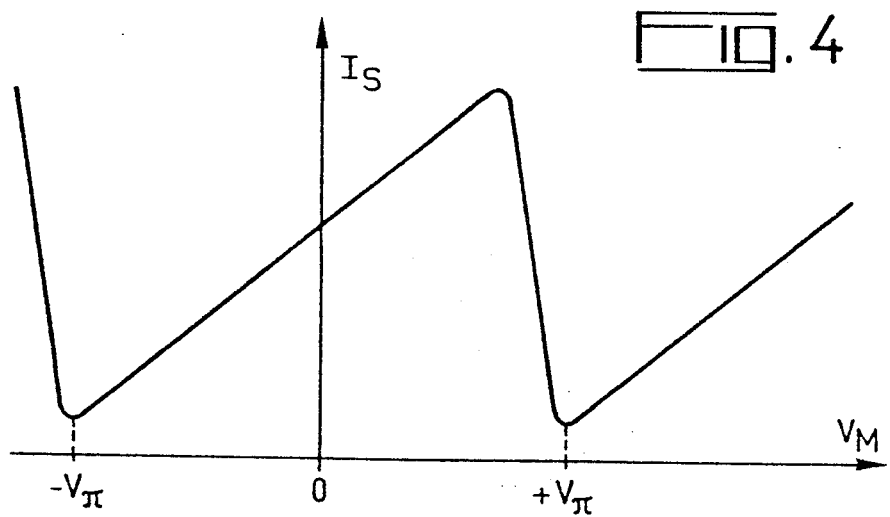
FIG. 4 is a response diagram for the modulator of the invention.

FIG. 4 shows the general trend of the variation curve of the emerging intensity $I_S$ as a function of the modulation voltage $V_M$. This curve has a saw-tooth trend, the intensity $I_S$ is minimum as previously, when $V_M$ is an uneven multiple of $V_\pi$. Between $+V_\pi$ and $-V_\pi$ for example we may find a range of voltages in which the variation of the output intensity may be considered as linear as a function of the modulating voltage. The extent of the zone of linearity, like the harmonic rate 2, depend on the feedback rate, i.e. on G and the input light intensity $I_E$.

One embodiment of the invention is shown in FIG. 5. The modulator is formed from a lithium niobate substrate 11. Guides 1, 2, 3 and 4 are constructed by photolithography and by diffusion of titanium to a certain thickness on one of the faces S of substrate 11. For the embodiment shown the orientation of the lithium niobate has been chosen so that axis c is perpendicular to the surface where the guides are deposited. These latter are disposed as illustrated in FIG. 1. The separator means 6 of FIG. 3 are provided by a fork, the output guide 4 being extended in a branch 9 recuperating a fraction of the energy whereas the other fraction is propagated in a branch 10 forming an angle of a low value with branches 4 and 9. Branches 9 and 10 extend to one end of substrate 11. Similarly branch 1 extends to the other end. The light energy coupled to branch 1 may for example come from an optical fiber 14, coupled endwise to substrate 11. Similarly, the output energy circulating in branch 9 may also be recovered by an optical fiber 12 coupled endwise to substrate 11. The energy propagated in branch 10 is recovered by a photodiode 7 disposed at the corresponding end of substrate 11. Because of the orientation chosen for the lithium niobate, electrodes $E_0$, $E_2$ and $E_3$ are disposed so that the electrical fields created in guides 2 and 3 are parallel to axis c, so perpendicular to surface S. In this case, the mode of propagation used in the guides is a TM mode. For that, it is necessary for an electrode of each pair $E_0-E_3$ and $E_0-E_2$ to cover respectively guides 3 and 2. It has been chosen for $E_0$ to cover guide 3 and $E_2$ to cover guide 2. Thus, if voltages of the same polarity are applied to electrodes $E_2$ $E_3$ in relation to electrode $E_0$ connected to ground, the electrical fields created in guides 2 and 3 are opposite in direction. Electrical connections connect, on the one hand, electrode $E_3$ to a source 13 providing the modulating voltage $V_M$ and, on the other hand, the output of photodiode 7 to electrode $E_2$ providing the feedback voltage $V_R$. The choice of the orientation of axis c (perpendicular to the surface where the guides are created as shown in FIG. 5, or parallel to this surface and perpendicular to the directions of propagation in the guides, as in FIG. 1) and the arrangement of the electrodes which results therefrom for obtaining the maximum electro-optical effects, are immaterial to the result insofar as the modulator is concerned. This choice depends possibly on other devices which could be constructed on the same substrate 11 in a transmission system. In fact, for some devices the choice of the orientation of axis c is not immaterial. So the modulator will be matched to the other devices. The case of FIG. 5 is that which is met with most frequently.

The device shown has been constructed with guides of a width of 2 μm and a substantially equal depth, arms 2 and 3 with a length of 5 mm, the distance between these arms being equal to 60 μm and the angle of the forks $B_1$ and $B_2$ being equal to 1°. A modulation rate, i.e. a measured ratio $I_{SM}/I_m$, of 0.95 and the characteristic voltage $V_\pi$ of a few volts have been obtained. The light coupled to the guides comes from an Hé Ne laser with a wavelength $\lambda = 0.63$ μm and is coupled by the edge. The device may also be used at other wavelengths (GaAs laser for example).

The embodiment of the modulator in accordance with the invention such as it is shown in FIG. 5 admits of numerous variations, particularly insofar as the arrangement of the electrodes, the construction of separator 6 and the position of photodetector 7 are concerned. FIG. 6 shows one embodiment of the invention in which separator 6 is formed by a directional coupler. The output branch of the interferometer 4 is extended by a guide 46 parallel to which there is disposed, spaced a small distance away, a similar guide 106. The light propagated in guide 46 is coupled by the phenomenon of evanescent waves in guide 106. By suitably choosing the coupling length L corresponding to the length at which guides 46 and 106 are sufficiently close to one another to allow coupling, there may be obtained at the output of the coupler division of the light energy according to a predetermined law. Guide 46 is extended by a guide 9 in which the output light intensity $I_S$ may be recovered. Guide 106 is extended by a guide 10 to which is joined a photodiode 7 supplying the feedback voltage $V_R$.

Figure 7:
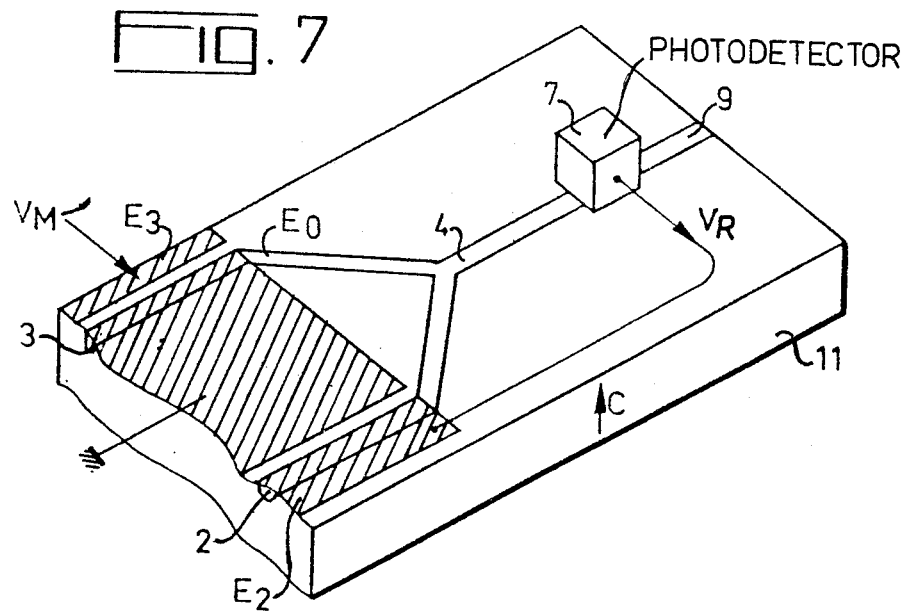

FIG. 7 shows another embodiment of the invention. According to this variation, photodiode 7 is stuck to the surface S of guide 4 so as to recover a part of the light energy circulating in this guide 4. In fact, with photodiode 7 made for example from silicon whose index of refraction is much higher than that of lithium niobate, a fraction of the light energy will leak towards the photodiode. The other fraction is recovered in the extension 9 of guide 4. This particularly simple embodiment enables separator 6, constructed separately, to be left out. In fact the separation takes place automatically by means of the guide-diode junction.

Figure 8:
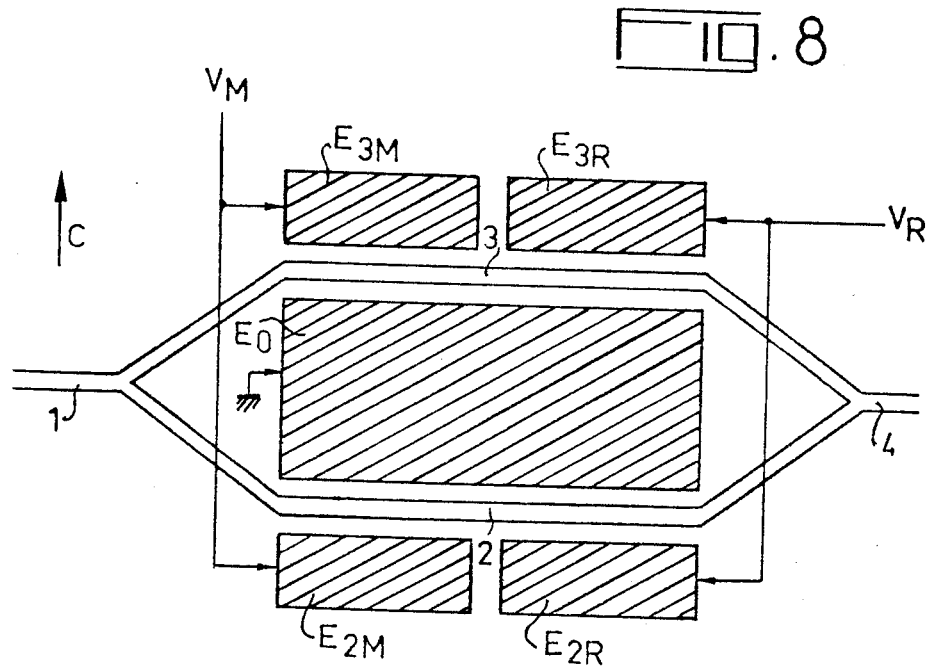

FIG. 8 shows another embodiment of the control electrodes of the interferometer. In the above description, the modulating electric field and the feedback electric field are applied separately one to one of the arms of the interferometer, the other to the other arm. It is possible to apply these electric fields simultaneously to both arms. In the embodiment shown in FIG. 8, a part of the length of each arm of the interferometer is subjected to the modulating field from voltage $V_M$, whereas another part is subjected to the feedback field from voltage $V_R$. For that, a central electrode $E_0$ connected to ground is disposed between the two arms 2 and 3 as previously. On each side of arms 2 and 3 are disposed electrodes $E_{3M}$, $E_{3R}$ for branch 3 and $E_{2M}$, $E_{2R}$ for branch 2. Electrodes $E_{3M}$ and $E_{2M}$ are connected to voltage source $V_M$. The electrodes $E_{3R}$ and $E_{2R}$ are connected to the output of the photodiode 7 or of amplifier 8. The fact of applying electric fields of the same length and opposite in direction to the two arms 2 and 3 of the interferometer increases the sensitivity of the modulator, i.e. reduces the modulating voltages required to obtain a given phase shift. If for example electrodes $E_{3M}$ and $E_{2M}$ have the same length as the preceding electrodes $E_2$ and $E_3$, the lengths of electrodes $E_{2R}$ and $E_{3R}$ being chosen depending on the value of voltage $V_R$ obtained at the output of the photodiode to obtain the desired feedback rate, the sensitivity of the modulator is multiplied by two. Furthermore, since the device is symmetrical, the modulation rate may be increased. It is also possible to have other electrode arrangements, for example to leave out or both pairs of electrodes for one of the two guides, or else to keep two electrodes on one side and a single electrode on the other, or else any other arrangements enabling two independent electric fields to be obtained, one proportional to the modulating voltage, the other proportional to the output light intensity supplying the feedback.

The above-described modulator may be integrated, with other optical functions, in an integrated optical circuit usable for example in a transmission system for optical telecommunications.

It is apparent that within the scope of the invention, modifications and different arrangements can be made other than are here disclosed. The present disclosure is merely illustrative with the invention comprehending all variations thereof.

What is claimed is:

1. A light intensity modulator comprising, on the surface S of a substrate having electro-optical properties, an interferometer with two arms forming monomode guides connected to a monomode input guide intended to receive an incident optical radiation, the radiation fractions propagated in the two arms combining at the outlet of the interferometer in a monomode output guide, the intensity of the emerging radiation depending on the phase shift introduced into the interferometer by a modulating electric field applied to at least one of the arms, wherein there is further provided a light energy separator interposed on the output guide, for extracting a part of the emerging intensity to couple it to a photodetector supplying a feedback modulating electric field to at least the other of said arms, whereby the linear range of the output light intensity is improved.

2. The modulator as claimed in claim 1, wherein the interferometer and the guides are constructed on one of the faces of the substrate by creation of zones in which the index of refraction is greater than that of the substrate.

3. The modulator as claimed in claim 2, wherein the substrate is made from lithium niobate, the interferometer and the guides being obtained by localized diffusion of titanium.

4. The modulator as claimed in claim 3, wherein the first electrode is placed between the two arms so as to cover selectively one of the arms, the second electrode being placed so as to be adjacent this arm, the third electrode being placed so as to cover the other arm, so as to create in the guides electric fields perpendicular to the surface S.

5. The modulator as claimed in claim 3 and wherein the substrate is orientated so that its axis c is parallel to the electric fields created in the guides.

6. The modulator as claimed in claim 2, wherein the separator is formed by a fork in the output guide.

7. The modulator as claimed in claim 2, wherein the separator is formed by a directional two-branch coupler, one of the branches being formed by the output guide.

8. The modulator as claimed in claim 2, wherein the photodetector is stuck to the face S of the substrate, above the output guide, the separator being formed by the light coupling between the guide and the photodiode.

9. The modulator as claimed in claim 2, wherein the modulating and feedback electric field are applied respectively to the two arms of the interferometer and are obtained between a first electrode and respectively a second electrode and a third electrode, these three electrodes being disposed so that electric voltages applied respectively to the second and third electrodes and having the same polarity in relation to the first electrode produce in the two arms electric fields opposite in direction.

10. The modulator as claimed in claim 9, wherein the three electrodes are disposed so as to be adjacent the arms of the interferometer, the first one being placed on each side of the interferometer so as to create in the arms electric fields parallel to the surface S.

11. The modulator as claimed in claim 2, wherein the modulating and feedback electric fields are the same in direction and are applied to at least one of the arms by means of two sets of electrodes following one another along the length of this arm.

* * * * *